United States Patent [19]

van der Lely

[11] 4,074,765
[45] Feb. 21, 1978

[54] SOIL CULTIVATING IMPLEMENTS

[76] Inventor: Cornelis van der Lely, 7 Bruschenrain, Zug, Switzerland

[21] Appl. No.: 688,343

[22] Filed: May 20, 1976

[30] Foreign Application Priority Data

May 23, 1975 Netherlands .......................... 7506058

[51] Int. Cl.² ........................ A01B 33/06; A01B 33/16
[52] U.S. Cl. ....................................... 172/59; 172/79; 172/311; 172/456
[58] Field of Search ................. 172/59, 311, 456, 522, 172/526, 79; 111/54, 56

[56] References Cited

U.S. PATENT DOCUMENTS

| 2,641,886 | 6/1953  | Graham  | 172/311 |
| 3,115,190 | 12/1963 | Listiak  | 172/59  |
| 3,411,467 | 11/1968 | Lely     | 111/54  |
| 3,667,551 | 6/1972  | Lely     | 172/59  |
| 3,826,314 | 7/1974  | Lely     | 172/59  |
| 3,897,832 | 8/1975  | Leedahl  | 172/311 |

Primary Examiner—Richard J. Johnson
Attorney, Agent, or Firm—Mason, Mason & Albright

[57] ABSTRACT

A soil cultivating implement is structured to work soil across a broad path and includes a frame that can be towed when hitched to trail substantially behind the rear of a prime mover. The main frame supports a central frame portion and an outer frame portion is pivoted at each lateral end of the central portion. Each frame portion is elongated with a corresponding group of soil working members being rotatably mounted on upwardly extending axes. The frame portions and groups of soil working members are located side-by-side in a row that extends transverse to the direction of operative travel. For transport purposes, each outer group is pivoted by a hydraulic system to an upwardly tilted position to narrow the implement's width. Ground wheels are hydraulically interconnected to the frame and positioned at the rear of the central portion to sustain essentially all of the implement's weight. The height of the implement frame is adjustable with the wheels. Each outer portion is pivoted to the central portion and interconnected to a transverse beam of the frame by a forward pivot connection. A planting implement, such as a seed drill is attachable to the frame at the rear of the wheels and the seed drill frame is also foldable to a narrow transport position.

11 Claims, 5 Drawing Figures

SOIL CULTIVATING IMPLEMENTS

This invention relates to a cultivating implement in which a central group of soil working members is flanked by further groups of such members all of which extend transverse to the direction of travel. The wheeled framework supporting the several groups is pivotable to reduce the implement's width for transport.

Figure 1:
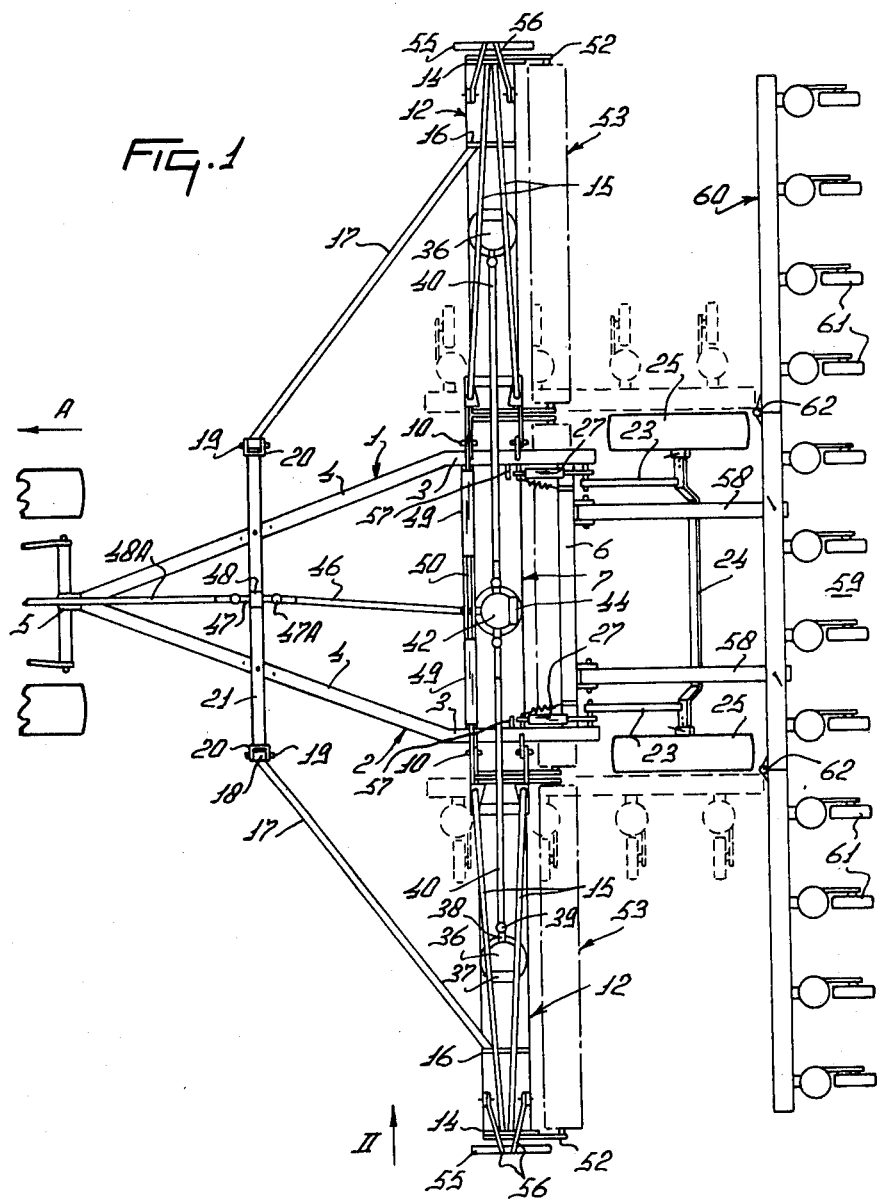

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, a seed drill being provided at the rear of the implement.

Figure 2:
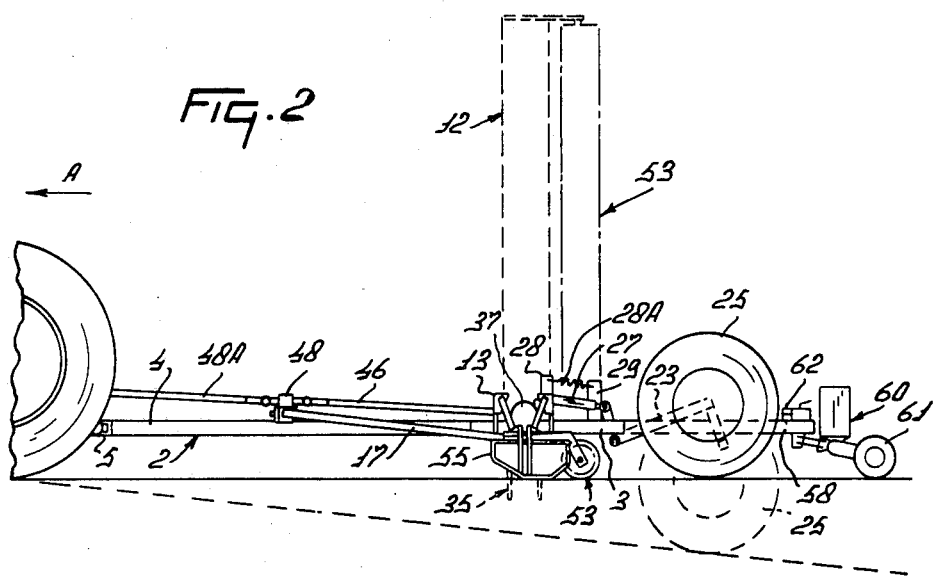
Figure 3:
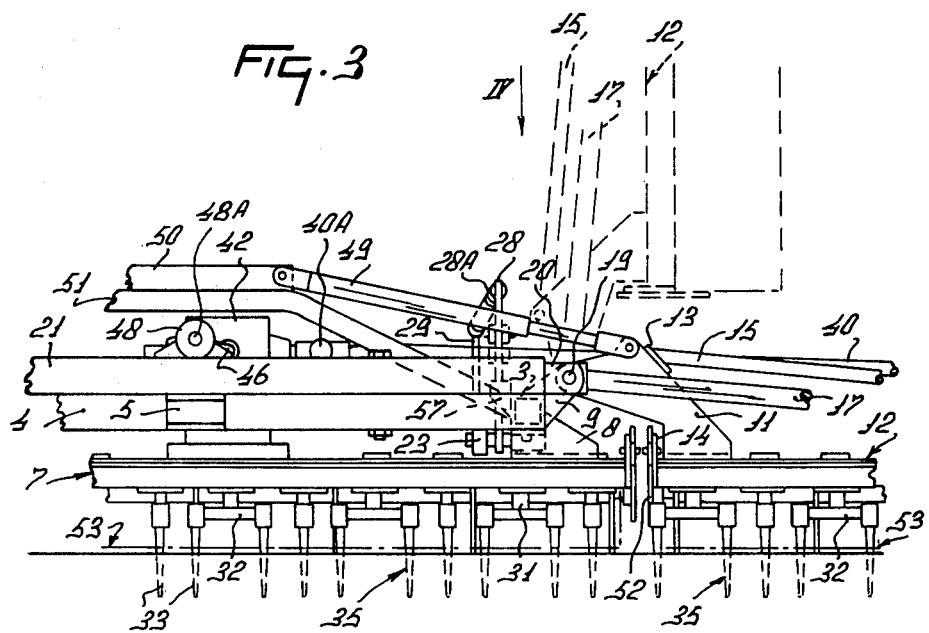
Figure 4:
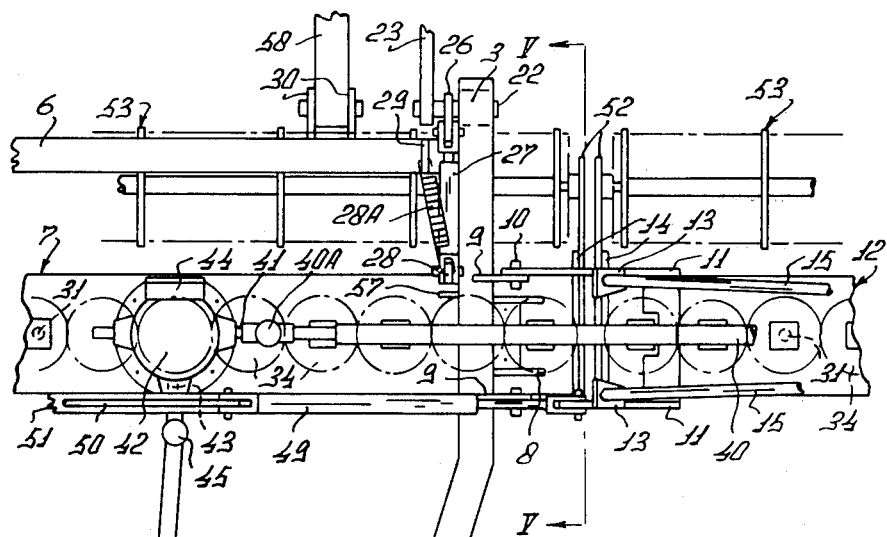
Figure 5:
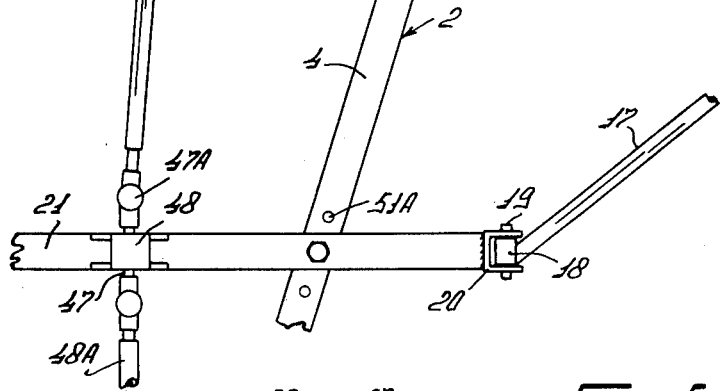
Figure 5:
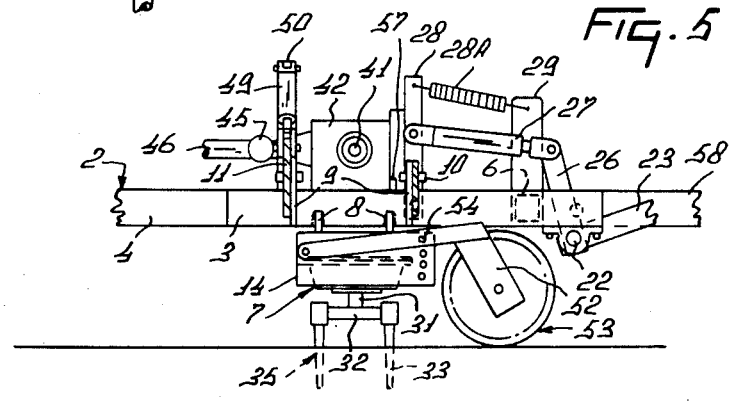

FIG. 2 is a side elevation as seen in the direction indicated by an arrow II in FIG. 1, an operative position of the implement being illustrated in full lines and an inoperative transport position thereof in broken lines, FIG. 3 is a partial front elevation of the implement to an enlarged scale as compared with FIGS. 1 and 2, FIG. 4 is a plan view as seen in the direction indicated by an arrow IV in FIG. 3, and FIG. 5 is a section taken on the line V—V in FIG. 4.

Referring to the accompanying drawings, the soil cultivating implement that is illustrated therein is in the form of a rotary harrow which comprises a frame having two beams 1 and 2 major portions 4 of which are forwardly convergent with respect to the intended direction of operative travel of the implement which is indicated in FIGS. 1 and 2 by the reference A. The frame beams 1 and 2 are substantially horizontally disposed and include rear portions 3 that are in substantially parallel relationship with one another and with the direction A. The leading ends of the major portions 4 of the beams 1 and 2, which portions are both straight, are interconnected at their junction point by a fork 5 whose two limbs are substantially horizontally disposed, in vertically spaced apart relationship, so as to project forwardly from the beams 1 and 2 with respect to the direction A. A substantially horizontal beam 6 perpendicularly interconnects the rear portions 3 of the beams 1 and 2 close to the rearmost ends of said portions 3. A hollow box-shaped frame portion 7 is connected to the lower surfaces of the two frame beams 3 so as to extend substantially parallel to the frame beam 6 at a location which is a short distance in advance of that beam 6 with respect to the direction A. The connection between the hollow frame portion 7 and the portions 3 of the two beams 1 and 2 is effected by upright substantially triangular plates 8 that are fastened to the top of the hollow frame portion 7 at four locations which are close to the front and rear of the frame portion 7 with respect to the direction A and close to the opposite ends of that frame portion. The rear substantially parallel portions 3 of the two frame beams 1 and 2 are provided, at locations that are respectively in front of, and behind, the corresponding plates 8, with four obliquely upwardly and outwardly inclined arms 9, the upper and outer ends of the four arms 9 being pivotally connected to four corresponding vertical plates 11 by four pivot pins 10 which are aligned, in two pairs, so as to define two parallel axes that are both substantially parallel to the direction A and that pass above the hollow frame portion 7 quite close to the opposite ends of the latter.

The four plates 11 are arranged in two pairs and each pair is secured to a corresponding one of two hollow box-shaped frame portions 12 that are both of similar construction to the hollow frame portion 7 and that, when the implement is in use, have their longitudinal axes in more or less coincident relationship with the longitudinal axis of the central hollow frame portion 7 and in perpendicular, or substantially perpendicular, relationship with the direction A. The two hollow frame portions 12 are, of course, turnable upwardly and downwardly about the axes defined by the corresponding pairs of pivot pins 10 relative to the central frame portion 7. Each pair of plates 11 is provided, very close to the tops of those plates, with transverse pieces 13 that project towards one another from the plates 11 concerned in perpendicular relationship with the planes of those plates. Upright plates 14 are mounted at the six ends of the three hollow frame portions 7 and 12 and supports 15, which serve as tie beams, extend between each pair of transverse pieces 13 and the upright plate 14 which is at the outermost end of the same hollow frame portion 12 as that which is provided with the plates 11 that carry said transverse pieces 13. There is a total of four of the supports 15 and it will be seen from the drawings that they are arranged in corresponding pairs that are gently convergent from the transverse pieces 13 to the respective upright plates 14. Moreover, when the implement is disposed in its operative position, each pair of supports 15 is inclined downwardly at a small angle to the horizontal from the corresponding transverse pieces 13 to the corresponding upright plate 14. Each hollow frame portion 12 is provided, at a location which is approximately one-quarter of the way along that portion 12 towards the central frame portion 7 from the outermost end thereof, with a vertical plate 16 (FIG. 1) each plate 16 extending rigidly between the top of the frame portion 12 concerned and the lower surfaces of the two overlying supports 15. The fronts of the two vertical plates 16 with respect to the direction A are both secured to the rear ends of corresponding forwardly convergent tubular supports 17 whose leading ends carry corresponding substantially horizontal sleeve bearings 18. The sleeve bearings 18 at the leading ends of the tubular supports 17 with respect to the direction A are considerably closer to an imaginary vertical plane of substantial, but not exact, symmetry of the implement which extends parallel to the direction A than are the vertical plates 16 at the rearmost ends of said tubular supports 17. A horizontal beam 21 is detachably secured to the tops of the convergent portions 4 of the two frame beams 1 and 2 so as to extend perpendicular to the direction A and so as to project for equal distances from the opposite side of the imaginary vertical plane of substantial symmetry of the implement that has just been referred to. The opposite ends of the beam 21 carry corresponding forks 20 whose vertically disposed limbs are spaced apart from one another in the direction A and each fork 20 has a corresponding one of the two sleeve bearings 18 turnably mounted between its limbs by a corresponding horizontal pivot pin 19 whose axis is coincident with that defined by one pair of the four pivot pins 10 that is located behind it relative to the direction A. Thus, the pins 10 at the inner ends of the outer pivotably mounted hollow frame portions 12 and the corresponding pivot pins 19 are located one behind the other with respect to the direction A. It will be noted that the horizontal beam 21 is located substantially midway between the opposite ends of the convergent portions 4 of the frame beams 1 and 2.

Stub shafts 22 that are horizontally aligned in a direction that is perpendicular to the direction A are turnably mounted in bearings bolted to the lower surfaces of the rear substantially paralel portions 3 of the two beams 1 and 2 at locations which are immediately behind the frame beam 6 with respect to the direction A (see particularly FIGS. 4 and 5 of the drawings). The aligned stub shafts 22 project towards one another from their bearings and their inner ends are secured to corresponding arms 23 which project upwardly and rearwardly therefrom with respect to the direction A. The rear ends of the two arms 23 are secured to a strip-shaped beam 24 which serves as an axle beam for the rotary mountings of two ground wheels 25 whose axes of rotation are substantially horizontally coincident in a direction that is substantially perpendicular to the direction A. As can be seen in outline in FIG. 1 of the drawings, the rotary mountings of the two ground wheels 25 are adjustable towards and away from one another along opposite end regions of the beam 24 so that the distance between said ground wheels 25 and/or the positions thereof relative to the path of travel of the whole implement can be adjusted to facilitate use of the implement in various row cultures. Each stub shaft 22 is provided, between its bearing and the corresponding arm 23, with an upwardly and forwardly inclined arm 26 whose upper end is pivotally connected to the free end of the piston rod of a corresponding hydraulic piston and cylinder assembly 27. Each of the two assemblies 27 extends substantially parallel to the direction A and has the leading base end of its cylinder pivotally connected to a corresponding arm 28 that projects upwardly from the portion 3 of the frame beam 1 or 2 concerned, the lower ends of the arms 28 being turnable relative to said beam portions 3 about an axis that is substantially horizontally parallel to the frame beam 6. The upper end of each pivotably mounted arm 28 is connected, at a level above that of the corresponding assembly 27, to the top of a corresponding upright arm 29 by a helical tension spring 28A that is substantially, although not exactly, parallel to the direction A. The two upright arms 29 are rigidly secured to the frame beam 6 at locations close to the opposite ends of that frame beam. Two pairs of lugs 30 project rearwardly from the back of the frame beam 6 at positions which are spaced only short distances inwardly from the opposite ends of said frame beam and these serve for the connection to the implement of a seed drill 59 or other tool or implement in a manner that will be further described below. The two pairs of lugs 30 are spaced at equal distances from the midpoint of the beam 6.

Each of the three hollow frame portions 7 and 12 has a plurality of corresponding substantially vertical or at least upwardly extending shafts 31 rotatably mounted therein in a single row, the longitudinal axes of the shafts 31 being spaced apart from one another at regular distances which preferably, but not essentially, have magnitudes of substantially 25 centimeters. In the embodiment which is being described, there are 12 of the shafts 31 in respect of each of the three hollow frame portions 7 and 12. The shafts 31 are rotatably journalled in bearings carried by upper and lower walls of the hollow frame portions 7 and 12 and each shaft 31 projects from beneath the bottom of the corresponding frame portion. The lowermost end of the downwardly projecting portion of each shaft 31 is secured to the midpoint of a corresponding horizontal or substantially horizontal tine support 32, said tine support 32 having sleeve-like holders at its opposite ends in which fastening portions of two corresponding rigid and downwardly extending tines 33 are firmly but releasably secured in a manner which it is not necessary to describe for the purposes of the present invention. Each pair of tines 33 constitutes, together with the corresponding support 32 and its tine holders, a rotary soil working or cultivating member 35. Each of the shafts 31 is provided, inside the corresponding hollow frame portion 7 or 12, with a straight-toothed or spur-toothed pinion 34, the pinions 34 being so arranged that each one of them has its teeth in mesh with those of its neighbour, or both of its neighbours, in the single row thereof that corresponds to the hollow frame portion 7 or 12 concerned.

In each of the two outer hollow frame portions 12, one of the center pair of shafts 31 has an upward extension through the top of said frame portion into a gear box 36 that is bolted onto the top of that frame portion. Bevel pinions (not visible in the drawings) located inside each gear box 36 place the upward extension of the corresponding shaft 31 in driven connection with a substantially horizontal shaft (not visible) that extends parallel to the length of the frame portion 12 concerned and thus substantially perpendicular to the direction A. One end of the substantially horizontal shaft that has just been referred to projects into a change-speed gear 37 together with one end of a corresponding overlying and parallel rotary input shaft 38 of the gear box 36. It is not necessary to describe the change-speed gears 37 in detail for the purposes of the present invention but it should be noted that, in each change-speed gear 37, the ends of the corresponding two substantially horizontal shafts are splined or otherwise keyed to receive the hubs of pairs of interchangeable and/or exchangeable straight-toothed or spur-toothed pinions. The transmission ratio between the input shaft 38 of the gear box 36 and the underlying row of shafts 31 will depend upon the pinion arrangement selected in the corresponding change-speed gear 37 and this arrangement thus governs the speed of rotation of the soil working or cultivating members 35 that are driven from each gear box 36 during the operation of the implement. The two gear boxes 36 and their rotary input shafts 38 are arranged substantially symmetrically at the opposite side of the imaginary vertical plane of substantial symmetry of the implement that extends parallel to the direction A and each input shaft 38 is coupled by a corresponding universal joint 36 to one end of a corresponding telescopic transmission shaft 40. The telescopic transmission shafts 40 extend from the universal joints 39 towards the opposite sides of a gear box 42 that is mounted on top of the central frame portion 7 and into which projects an upward extension of one of the central pair of shafts 31 that corresponds to said frame portion 7. The gear box 42 is thus mounted just to one side of the vertical plane of substantial symmetry of the implement that extends parallel to the direction A. The central gear box 42 has a rotary input shaft 43 that projects from the front thereof in substantially the direction A, the projecting end of said shaft 43 being splined or otherwise keyed to enable it to be driven in the manner that will be described below. Two rotary output shafts 41 project from opposite sides of the central gear box 42 and are horizontally aligned in a direction parallel to the length of the hollow frame portion 7 and thus in a direction that is substantially perpendicular to the direction A. The input shaft 43 of the gear box 42 directly drives the two output shafts 41 by way of co-operating bevel pinions (not visible) that are contained inside the gear box 42 and said shafts 41 are drivingly connected, in turn, to the inner ends of the two telescopic transmission shafts 40 by way of corresponding universal joints 40A. The rear of the central gear box 42 with respect to the direction A carries a change-speed gear 44 and the rearmost end of the rotary input shaft 43 projects into said change-speed gear 44, together with the rearmost end of an underlying and parallel shaft that is not visible in the drawings, the latter non-illustrated shaft being drivingly connected by bevel pinions to the aforementioned upward extension of one of the centre pair of shafts 31 that corresponds to the hollow frame portion 7. The ends of the two shafts that project rearwardly into the change-speed gear 44 are both splined and are arranged to receive chosen pair of interchangeable and/or exchangeable pinions in the same manner as has already been briefly explained in relation to the two change-speed gears 37.

The forwardly projecting splined or otherwise keyed end of the rotary input shaft 43 of the gear box 42 is driven from the rear end of a telescopic transmission shaft 46 through the intermediary of a universal joint 45, the leading end of said shaft 46 being, in turn, driven from the rear end of a short rotary shaft 47 by a further universal joint 47A. As can be seen in the drawings, the short rotary shaft 47 extends substantially horizontally parallel to the direction A and is rotatably journalled in a horizontal bearing 48 that is mounted on top of the beam 21 midway between the convergent portions 4 of the two frame beams 1 and 2. When the implement is in use, the leading plined or otherwise keyed end of the shaft 47 is placed in driven connection with the power take-off shaft at the rear of an agricultural tractor or other operating vehicle through the intermediary of a further telescopic transmission shaft 48A having universal joints at its opposite ends. The leading plate 11 of the pair of those plates that corresponds to one of the hollow frame portions 12 has the free end of the piston of a double-acting piston and cylinder assembly 49 pivotally connected to substantially its uppermost point. The base of the cylinder of the same assembly 49 is pivotally connected to one end of a strip 50 that extends substantially horizontally perpendicular to the direction A on top of a horizontal base portion of a bracket 51, the limbs of said bracket 51 diverging steeply downwardly away from its base and having their free ends rigidly secured to the rear substantially parallel portions 3 of the two frame beams 1 and 2. A second substantially symmetrically arranged double-acting piston and cylinder assembly 49 pivotally interconnects the opposite end of the strip 50 and substantially the top of the leading plate 11 that corresponds to the other of the two hollow frame portions 12.

Each of the six upright plates 14 at the opposite ends of the three hollow frame portions 7 and 12 has a corresponding arm 52 arranged alongside it, the two arms 52 that correspond to each of the three hollow frame portions 7 and 12 being turnable upwardly and downwardly relative to the plates 14 carried by that frame portion about substantially horizontally aligned strong pivots that are disposed at the fronts of said plates 14 with respect to the direction A (see particularly FIG. 5). Each plate 14 is formed, near its rearmost edge, with a curved row of holes that are equidistant from the axis defined by the corresponding pair of strong pivots and each arm 52 is formed with a single hole that is at the same distance from said axis and which can thus be brought into register with any chosen one of the holes in the immediately adjacent plate 14 by turning that arm 52 to an appropriate angular position about the corresponding strong pivot. Horizontal bolts 54, or equivalent horizontal locking pins, are provided for entry through the holes in the arms 52 and the selected holes in the plates 14. A rotatable supporting member in the form of an open ground roller 53 is rotatable mounted between rearmost downwardly directed portions of each pair of arms 52 and it will be seen that the particular angular positions of the arms 52 relative to the corresponding frame portions 7 and 12 that are fixed by the bolts 54 or equivalent locking pins dictate the levels of the substantially horizontal axes of rotation of the three rollers 53 relative to those of the corresponding hollow frame portions 7 and 12 and thus the maximum depths of penetration of the tines 33 into the soil that are possible during the operation of the implement. Two substantially vertical shield plates 55 that both extend substantially parallel to the direction A are located immediately beyond those two ends of the outer hollow frame portions 12 that are furthest remote from one another, said shield plates 55 being shaped so that lower edge regions thereof will slide over the ground surface in the direction A (see FIG. 2) and being arranged so that the plates will be able to turn upwardly and downwardly to match undulations in the surface of the soil that they may meet with during the operation of the implement. To this latter end, each shield plate 55 is pivotally connected by a corresponding pair of arms 56 (FIG. 1) to a pair of mountings on the top of the corresponding hollow frame portion 12, the pivotal connections being such as to define substantially horizontal axes that are substantially parallel to the direction A.

In the use of the soil cultivating implement that has been described, the fork 5 is connected to a tow bar at the rear of an agricultural tractor or other operating vehicle and the hydraulic piston and cylinder assemblies 27 and 49 are placed in operative connection with the hydraulic system of the same tractor or other vehicle by way of ducts that are not illustrated in the accompanying drawings. The leading end of the telescopic transmission shaft 48A is placed in driven connection with the rear power take-off shaft of the same tractor or other operating vehicle by way of a universal joint which is not visible in the drawings so that the rotary soil working or cultivating members 35 that correspond to the three hollow frame portions 7 and 12 may be driven from said tractor or other operating vehicle by way of the previously described transmission. Before work commences, the maximum depths to which the tines 33 of the members 35 can penetrate into the soil are set by bringing the axes of rotation of the three rollers 53 to appropriate levels relative to the three hollow frame portions 7 and 12 by entering the bolts 54 or equivalent locking pins through appropriate holes in the upright end plates 14 of said frame portions 7 and 12. Moreover, the pistons of the hydraulic assemblies 27 are set in positions of extension relative to their cylinders which will maintain the common axis of rotation of the two ground wheels 25 at a desired level relative to that of the central hollow frame portion 7. It will be noted that, in this connection, the two pivotably mounted arms 28 can bear against stops 57 which are carried by the rear substantially parallel portions 3 of the two frame beams 1 and 2 at locations which are just in front of said arms 28. Before a cultivating operation actually commences, the adjustments that will be made will include attention to the three change-speed gears 37 and 44 to ensure that the three groups of rotary soil working or cultivating members 35 will revolve at a desired speed in response to a more or less standard imput speed of rotation that is applied to the shaft 43 of the central gear box 42. The speed of rotation that will be chosen for the members 35 will depend upon the nature and condition of the soil that is to be cultivated and the consistency which it is desired that it should have at the end of the operation. The three change-speed gears 37 and 44 will, almost invariably, be adjusted to give the same speeds of rotation for all of the members 35 of the three groups but it is noted that, under exceptional operating conditions, one of the three change-speed gears could be set for a speed of rotation of the corresponding group of members 35 that is different to the speeds of rotation of the other two groups or all three change-speed gears 37 and 44 could be set for different speeds of rotation of the corresponding groups of members 35. Only very rarely indeed will the operating circumstances make different speeds of rotation amongst the three groups of members 35 desirable and, in the vast majority of operations, all of the members 35 of the three groups will rotate at the same speed.

Due to the intermeshing arrangement of the pinions 34 inside the three hollow frame portions 7 and 12, each pinion 34, and the corresponding soil working or cultivating members 35, will, during a cultivating operation, rotate in the opposite direction to that of its immediate neighbour, or to those of both its immediate neighbours, in the same group of members 35. In the embodiment of FIGS. 1 to 5 of the drawings which is being described, there are three groups of the soil working or cultivating members 35, each group comprising 12 of the members 35 so that there is a total of thirty-six of those members that are arranged, at least as seen in the plan view of FIG. 1 of the drawings, in a single row that extends substantially perpendicular to the direction A. Actually, the row of 36 members 35 will not be truly straight during the operation of the implement, except at random momentary occasions, because of the upward and downward pivotal movements of the outer frame portions 12 and the corresponding groups of members 35 that will take place about the two axes that are defined by the two sets of pivot pins 10 and 19 relative to the central hollow frame portion 7. Since the free ends or tips of the two tines 33 of each soil working or cultivating member 35 are spaced apart from one another by a distance which is a little in excess of the regular spacing (preferably substantially 25 centimeters) between the axes of rotation of the shafts 31 in each group of members 35, said members work overlapping strips of soil during operative progress of the implement in the direction A and a single broad strip of worked soil results. The three groups of members 35 substantially adjoin or overlap one another so that no major discontinuities in the broad strip of worked soil are caused in line, in the direction A, with the junctions between the hollow frame portion 7 and the two hollow frame portions 12. Generally speaking, the implement cultivates the soil in such a way that the surface of the strip which has been cultivated thereby in uninterrupted throughout its width. The two shield plates 55 at the opposite ends of the row of 36 members 35 serve to minimise ridging of the soil at the margins of the strip that is worked by the implement and also co-operate with the neighbouring members 35 in preventing loose stones and other potentially dangerous items from being flung laterally of the path of travel of the implement by the rapidly moving tines 33.

With the preferred spacing between the axes of rotation of neighbouring shafts 31 that has been mentioned above, the implement of FIGS. 1 to 5 of the drawings has an overall working width of substantially 9 meters since each of the three groups of members 35 has a working width of substantially 3 meters. These particular dimensions are not, of course, essential. Hollow frame portions and corresponding groups of the members 35 may be employed which have effective widths of 2.0 meters or 2.5 meters or widths greater than 3.0 meters, the number of members 35 per group being reduced or increased as required. If required, the detachably mounted horizontal beam 21 may be replaced by alternative beams which are similar except for their dimensions, such alternative beams, if required, being connected to the portions 4 of the frame beams 1 and 2 at locations that are further to the rear, or further to the front, with respect to the direction A, than is the beam 21. FIG. 4 of the drawings shows two alternative fastening holes 51A for use with such alternative beams. Two arms 58 have their leading ends pivotally connected to the horizontal beam 6 by aligned pivot pins that co-operate with the pairs of rearwardly directed lugs 30. The arms 58 form parts of, or are provided for use with, a further agricultural implement that is arranged behind the soil cultivating implement with respect to the direction A. FIGS. 1 to 5 of the drawings illustrate the provision of the seed drill 59 as the further agricultural implement but alternative implements can equally well co-operate with the soil cultivating implement. The seed drill 59 which is illustrated is pivotally connected to the beam 6 of the soil cultivating implement by way of the arms 58 and comprises a horizontal beam 60 which, when the implement is in use, extends substantially perpendicular to the direction A and which has a plurality, such as 12, of sowing units 61 connected to it at regularly spaced intervals along its length. The seed drill 59 is a precision seed drill whose construction and operation it is not necessary to describe for the purposes of the present invention, the sowing units 61 being units that are known per se.

As previously mentioned, each of the two groups of twelve soil working or cultivating members 35 that corresponds to the two outer hollow frame portions 12 can pivot relative to the hollow central frame portion 7, to match undulations in the surface of the ground, by turning upwardly and downwardly about the axis that is afforded by the corresponding pair of pivot pins 10 and the corresponding pivot pin 19, those three pivot pins being spaced apart from one another in the direction A with the pivot pin 19 foremost. The ground wheels 25 are bodily pivotable to a limited extent relative to the frame of the implement about the axis defined by the substantially horizontal stub shafts 22. The arrangement is, in fact, such that the tension springs 28A tend to turn the ground wheels 25 bodily downwards towards the ground surface and oppose bodily upward displacements of said wheels. When the implement is to be transported from one place to another without performing any working operation, the pistons of the double acting hydraulic piston and cylinder assemblies 49 are retracted into their cylinders and this causes the two outer hollow frame portions 12, and the parts which they carry, to turn upwardly about the axes that are defined by the pivot pins 10 and 19 until they reach the positions that are shown in broken lines in FIGS. 2 and 3 of the drawings. It will readily be appreciated that this reduces the overall width of the implement to little more than the width of the path of travel of the agricultural tractor or other vehicle which operates and tows the implement. In the case of the particular embodiment which is illustrated in FIGS. 1 to 5 of the drawings, the inoperative transport width of the soil cultivating implement alone is substantially 4.0 meters. When the outer hollow frame portions 12 have been tilted upwardly, the pistons of the two assemblies 27 are extended from their cylinders and this causes the two ground wheels 25 to be displaced bodily downwards with the result that the frame is raised relative to the ground surface. This position of the ground wheels 25 is shown in broken lines in FIG. 2 of the drawings and it will be evident from a comparison between that position and the operative position that is also shown in the same Figure, but in full lines, that the soil working or cultivating members 35 of the central group thereof have their tines raised well clear of contact with the ground surface. The implement can then be transported by towing it forwardly in the direction A.

The horizontal beam 60 of the precision seed dril 59 is, in fact, formed in three separate portions and it will be seen from FIG. 1 of the drawings that the outer two of those three portions can be turned forwardly through substantially 90° about the axes that are defined by substantially vertical hinges 62. This greatly reduces the width of the implement for inoperative transport purposes and brings it to substantially the position thereof that is shown in broken lines in FIG. 1 of the drawings, it being remembered that the outer hollow frame portions 12 of the soil cultivating implement will already have been tilted upwardly about the axes defined by the pivot pins 10 and 19. Naturally, if the hollow frame portions, or at least the central hollow frame portion 7, of the soil cultivating implement were of smaller width than in the embodiment that has been described, the overall transport width of that implement alone would be smaller as would the overall transport width of a combination of the soil cultivating implement with a further implement such as a matchingly dimensioned seed drill. Under such circumstances, the overall transport width could be 3.0 meters or less.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating implement comprising a frame and a group of rotatable soil working members journalled in an elongated central portion of said frame, an elongated outer portion pivoted at each lateral side of said central portion and respective further groups of rotatable soil working members being journalled in the outer portions, said soil working members and further soil working members being rotatable about corresponding upwardly extending axes defined by respective shafts and said shafts being positioned in a row that extends transverse to the direction of travel, driving means engaging said soil working members and further members, two beams of said frame extending in the general direction of travel and said beams having rear portions that extend substantially parallel to one another and forward convergent portions that comprise coupling means, said rear portions being connected to the central frame portion and positioned above same, each outer portion being pivoted to the rear beam portions with spaced apart pivots, the axes of said pivots extending in the direction of travel and said outer portion being pivotable to an upward tilted transport position about said axes, respective supports connected to the outer frame portions intermediate the lengths thereof, each support extending forwardly to a pivot connection with the remainder of said frame and said connection having a pivot axis in line with said first mentioned pivot axes, said supports being displaceable with the outer frame portions in the latter's transport position, said rear beam portions being supported on ground wheels located at the rear of said central position, said ground wheels being adjustably connected to the rear portions and vertically displaceable relative to those portions, whereby the central and outer portions can be raised to an inoperative transport position.

2. An implement as claimed in claim 1, wherein said support is fastened to said outer portion at a location spaced along that portion from its outer end by a distance equal to about one-quarter of the total length of that portion.

3. An implement as claimed in claim 1, wherein said outer portion has tie supports that extend and converge from adjacent the pivotal connection of that portion to said rear beams portion towards the outer end of the outer portion.

4. An implement as claimed in claim 3, wherein said tie supports are inclined to the horizontal and extend downwardly away from said central portion.

5. An implement as claimed in claim 3, wherein each outer portion is upwardly tiltable and displaceable by a hydraulic piston and cylinder assembly that interconnects an inner end of that portion with said frame.

6. An implement as claimed in claim 5, wherein there are two piston and cylinder assemblies that are connected to tilt two outer portions at opposite sides of said central portion and said assemblies have their longitudinal axes in substantially coincident relationship.

7. An implement as claimed in claim 1, wherein said wheels are pivoted to said rear beam portions on arm means and at least one hydraulic piston and cylinder assembly interconnects said arm means to the frame, said wheels being displaceable upwardly to a limit defined by a stop on said frame and said stop being positioned to arrest the pivoting of said arm means, spring means interconnecting said wheels to the frame and biasing the wheels downwardly.

8. A soil cultivating implement comprising a frame and a group or rotatable soil working members journalled in an elongated central portion of said frame, an elongated outer portion pivoted at each lateral side of said central portion and respective further groups of rotatable soil working members being journalled in the outer portions, said soil working members and further soil working members being rotatable about corresponding upwardly extending axes defined by respective shafts and said shafts being positioned in a row that extends transverse to the direction of travel, driving means engaging said soil working members and further members, two beams of said frame extending in the general direction of travel and said beams having rear portions that extend substantially parallel to one another and forward convergent portions that comprise coupling means, said rear portions being connected to the central frame portion and positioned above same, each outer portion being pivoted to the rear beam portions with spaced apart pivots, the axes of said pivots extending in the direction of travel and said outer portion being pivotable to an upward tilted transport position about said axes, respective supports connected to the outer frame portions intermediate the lengths thereof, each support extending forwardly to a pivot connection with the remainder of said frame and said connection having a pivot axis in line with said first mentioned pivot axis, said driving means comprising a gear box on said central portion and a corresponding transmission shaft that extends from said box, laterally to respective gear means of each further group of soil working members, said transmission shaft being displaceable upwardly with the corresponding outer portion in the latter's transport position.

9. An implement as claimed in claim 8, wherein a transverse beam bridges said convergent portions and corresponding supports interconnect each outer portion with a respective pivot connection to said transverse beam.

10. An implement as claimed in claim 8, wherein a corresponding supporting roller is positioned to the rear of each frame portion, said roller being pivoted to said frame portion with arms and means adjusting the relative position of the roller to the frame portion to regulate the working depth of the implement.

11. An implement as claimed in claim 8, wherein ground wheels are pivoted to the rear beam portions and a further implement is coupled to the rear of said frame and positioned to the rear of said wheels, said further implement extending across the working width of said frame portions and the sides of the further implement being foldable to a reduced width in which the sides extend forwardly adjacent said wheels.

* * * * *